G. D. BUCK.
CUTTING DEVICE FOR COPYING MACHINES.
APPLICATION FILED JULY 14, 1917.

1,301,379.

Patented Apr. 22, 1919.

Inventor,
George D. Buck
By Knight & Cook
Attorneys

UNITED STATES PATENT OFFICE.

GEORGE D. BUCK, OF ST. LOUIS, MISSOURI, ASSIGNOR OF ONE-THIRD TO HICKMAN P. RODGERS AND ONE-THIRD TO STEPHEN D. RODGERS, BOTH OF ST. LOUIS, MISSOURI.

CUTTING DEVICE FOR COPYING-MACHINES.

1,301,379.  Specification of Letters Patent.  Patented Apr. 22, 1919.

Application filed July 14, 1917. Serial No. 180,617.

*To all whom it may concern:*

Be it known that I, GEORGE D. BUCK, a citizen of the United States of America, a resident of the city of St. Louis, State of Missouri, have invented certain new and useful Improvements in Cutting Devices for Copying-Machines, of which the following is a full, clear, and exact description, reference being had to the accompanying drawings, forming a part of this specification.

My invention relates to improvements in cutting devices particularly adapted for use in copying machines or key cutting machines. Prior to this invention, rotary files have been used as the cutting elements in machines of this kind, the key blank being moved along the periphery of an annular file member. Such annular files cost several dollars, and they are not well adapted to perform all of the operations involved in cutting different kinds of keys.

Therefore, one of the objects of my invention is to produce a key cutting machine equipped with a rotary cutting member in the form of a simple saw blade, preferably an ordinary hack-saw, which can be bought for 5 or 10 cents, instead of several dollars. In addition to effecting a great saving in the cost of the cutting member, I have provided a cutting device well adapted to form various different kinds of keys, without changing the cutting member. The new cutter may be used in forming irregular corrugations at the edges of key blanks and also as a means for forming narrow slots in padlock keys and the like.

To accomplish all of the above mentioned results, the saw preferably extends laterally from one side of a rotary saw holder, and the work is advanced in a line radial to the axis of the saw, as will be hereinafter described.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure 1:
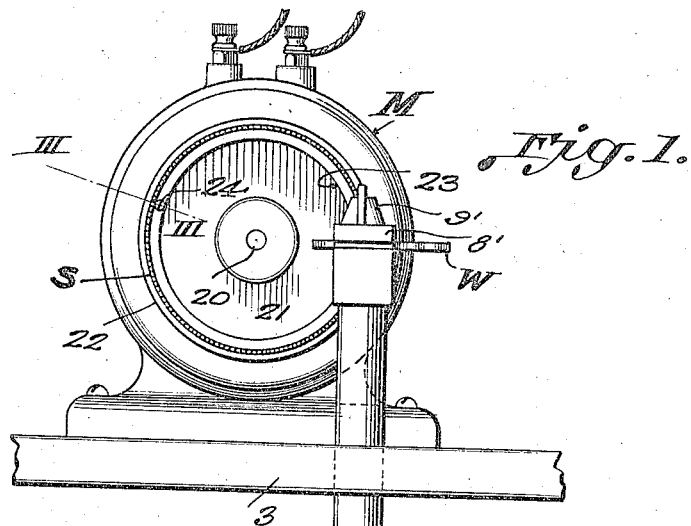
Figure 1 is a front elevation of a portion of a key cutting machine constructed in accordance with my invention.
Figure 2:
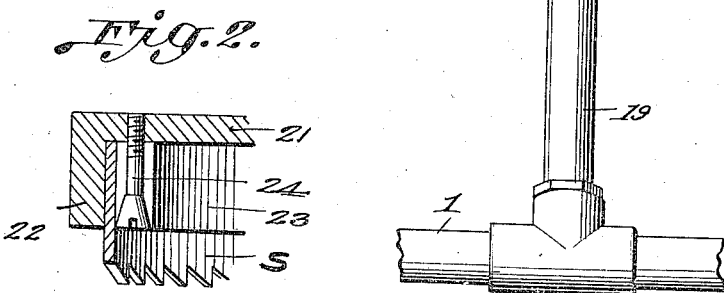
Fig. 2 is an enlarged section on the line III—III, Fig. 1, showing the means for securing the saw member to the saw holder.
Figure 3:
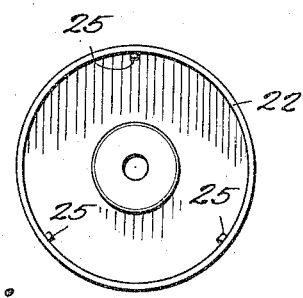
Fig. 3 is a detail view of the rotary saw holder.
Figure 4:
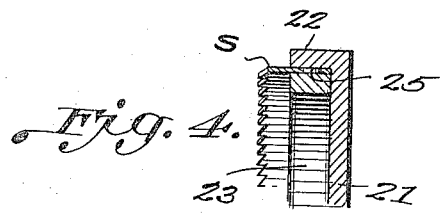
Fig. 4 is an enlarged fragmentary view showing the saw member secured to the saw holder.

19 designates a work holding arm extending upwardly from the shaft 1 and passing through a slot in the table 3. The work W, usually a key blank, is secured to the work holding arm by means of a cap 8' and a screw 9'.

M designates an electric motor having a power shaft 20 to which a circular saw holder 21 is secured. An annular flange 22, extending laterally from one side of the saw holder 21, is provided with an internal annular seat for a circular saw blade S, the latter being in the form of a band fitted to said annular seat and extending laterally from one side of the saw holder 21. By mounting the saw member in this manner I can utilize a simple and very inexpensive hack-saw blade as a very efficient substitute for the expensive cutting elements heretofore used in key cutting machines.

23 designates an expansible ring surrounded by the saw member S and closely fitted to the inner face thereof. A tapered expanding screw 24, arranged between the ends of the ring 23 may be adjusted to expand said ring, thereby firmly securing the saw member to the circular saw holder. The saw member is preferably perforated to receive projections 25, which extend inwardly from the lateral flange 22 on the saw holder.

The work W is arranged at a right angle to the axis of the rotary saw, and the work holding arm 19 may be moved in a direction parallel with the shaft 1, with the result of moving the work in a line radial to the axis of the rotary saw. The work holding arm 19 can also be moved about the axis of shaft 1 for the purpose of moving the work toward and away from the operating edge of the saw. By combining these elements with each other in this manner the teeth of the circular saw will move transversely of the work, and although the saw travels in a circular path, the cutting operation will be performed in a line approximately at a right angle to the work. In other words, the work being radial to the circular path of the saw, the arc formed on the work by the cutting edge will very nearly approximate a line at right angles to the length of the work. The deviation from such a line is so slight that the curvature of the saw does not materially affect the accuracy of the key.

It will be apparent that various kinds of keys having corrugated edges or narrow slots may be duplicated by the device herein shown, and the operation known as "routing" may be performed by moving the work in a straight line toward the axis of the saw.

I claim:—

1. A rotary saw comprising a rotatable saw holder having a lateral flange provided with an internal annular seat, projections extending inwardly from said internal annular seat, a saw blade provided with openings for the reception of said projections, said saw blade being in the form of a circular band fitted to said internal annular seat and extending laterally from one side of said saw holder, an expansible ring surrounded by said circular band and fitted to the inner face thereof, and means for securing said expansible ring so as to maintain the saw in firm engagement with said annular seat.

2. A rotary saw comprising a rotatable saw holder having a lateral flange provided with an internal annular seat, projections extending inwardly from said internal annular seat, a saw blade provided with openings for the reception of said projections, said saw blade being in the form of a circular band fitted to said internal annular seat and extending laterally from one side of said saw holder, an expansible ring surrounded by said circular band and fitted to the inner face thereof, and a tapered expanding screw arranged between the ends of said expansible ring to force the saw into firm engagement with its seat.

3. A rotary saw comprising a rotatable saw holder provided with a circular seat, a thin flexible hack saw blade bent to form a continuous annular band and fitted to said circular seat, said thin flexible hack saw blade being extended laterally from one side of said rotatable saw holder, said circular seat and the thin flexible hack saw blade being concentric with the axis of said rotatable saw holder, and fastening means whereby said thin flexible hack saw blade is firmly forced into engagement with said circular seat.

In testimony that I claim the foregoing I hereunto affix my signature.

GEORGE D. BUCK.

Copies of this patent may be obtained for five cents each, by addressing the "Commissioner of Patents, Washington, D. C."